(12) United States Patent
Schlansker et al.

(10) Patent No.: US 9,871,749 B2
(45) Date of Patent: Jan. 16, 2018

(54) SWITCH ASSEMBLY

(71) Applicant: Hewlett Packard Enterprise Development LP, Houston, TX (US)

(72) Inventors: Michael Schlansker, Palo Alto, CA (US); Jean Tourrilhes, Palo Alto, CA (US); Jose Renato G. Santos, Palo Alto, CA (US); Michael Renne Ty Tan, Palo Alto, CA (US); Moray McLaren, Bristol (GB)

(73) Assignee: Hewlett Packard Enterprise Development LP, Houston, TX (US)

(*) Notice: Subject to any disclaimer, the term of this patent is extended or adjusted under 35 U.S.C. 154(b) by 103 days.

(21) Appl. No.: 14/911,081

(22) PCT Filed: Aug. 9, 2013

(86) PCT No.: PCT/US2013/054254
§ 371 (c)(1),
(2) Date: Feb. 9, 2016

(87) PCT Pub. No.: WO2015/020665
PCT Pub. Date: Feb. 12, 2015

(65) Prior Publication Data
US 2016/0191425 A1  Jun. 30, 2016

(51) Int. Cl.
*H04L 12/931* (2013.01)
*H04L 12/24* (2006.01)
*H04L 12/935* (2013.01)
*H04L 12/939* (2013.01)

(52) U.S. Cl.
CPC ........... *H04L 49/40* (2013.01); *H04L 41/082* (2013.01); *H04L 49/30* (2013.01); *H04L 49/35* (2013.01); *H04L 49/552* (2013.01)

(58) Field of Classification Search
None
See application file for complete search history.

(56) References Cited

U.S. PATENT DOCUMENTS

| | | | |
|---|---|---|---|
| 4,872,160 A | 10/1989 | Hemmady et al. | |
| 7,389,046 B1 | 6/2008 | Tanaka et al. | |
| 8,270,830 B2 | 9/2012 | Kirkpatrick et al. | |
| 8,406,128 B1 | 3/2013 | Brar et al. | |
| 2006/0015712 A1 | 1/2006 | Ang et al. | |
| 2007/0077998 A1 | 4/2007 | Petrisor | |
| 2008/0275975 A1 | 11/2008 | Pandey et al. | |
| 2009/0157851 A1 | 6/2009 | Dake et al. | |
| 2013/0188486 A1 | 7/2013 | Thacker et al. | |

FOREIGN PATENT DOCUMENTS

| | | |
|---|---|---|
| JP | 2004336498 A | 11/2004 |
| KR | 100965645 B1 | 6/2010 |
| KR | 1020110086820 A | 8/2011 |

OTHER PUBLICATIONS

Hong Liu et al., "Scaling Optical Interconnects in Datacenter Networks; Opportunities and Challenges for WDM," 2010 18th IEEE Symposium on High Performance Interconnects, 2010, pp. 113-116, IEEE.

(Continued)

*Primary Examiner* — Diane Lo
(74) *Attorney, Agent, or Firm* — Trop, Pruner & Hu, P.C.

(57) ABSTRACT

A technique includes using circuit switches to selectively couple packet switches of a switch assembly to the port connectors of the assembly.

15 Claims, 9 Drawing Sheets

(56) References Cited

OTHER PUBLICATIONS

International Search Report and Written Opinion, International Application No. PCT/US2013/054254, dated May 13, 2014, pp. 1-8.
L. Schares et al., "A Reconfigurable Interconnect Fabric with Optical Circuit Switch and Software Optimizer for Stream Computing Systems," OSA/OFC/NFOEC 2009, pp. 1-3, IEEE.
Extended European Search Report, EP Application No. 13895993.2, dated Feb. 8, 2017, pp. 1-6, EPO.

SWITCH ASSEMBLY

BACKGROUND

The tenants of a datacenter may have variety of different needs, such as host numbers, access bandwidth, and availability. Moreover, hosts or applications may have specialized needs for a specific balance of compute resources, wide area access resources, network allocated storage (NAS), storage area network (SAN), and so forth. Additionally, some applications may use multiple networks, such as networks for primary storage, failover networks, production and research, control and data, local area network (LAN), storage area network (SAN), interactive networks, batch networks, and so forth. Applications may also use specialized transports, such as InfiniBand or Fiber Channel.

DETAILED DESCRIPTION

Figure 1:
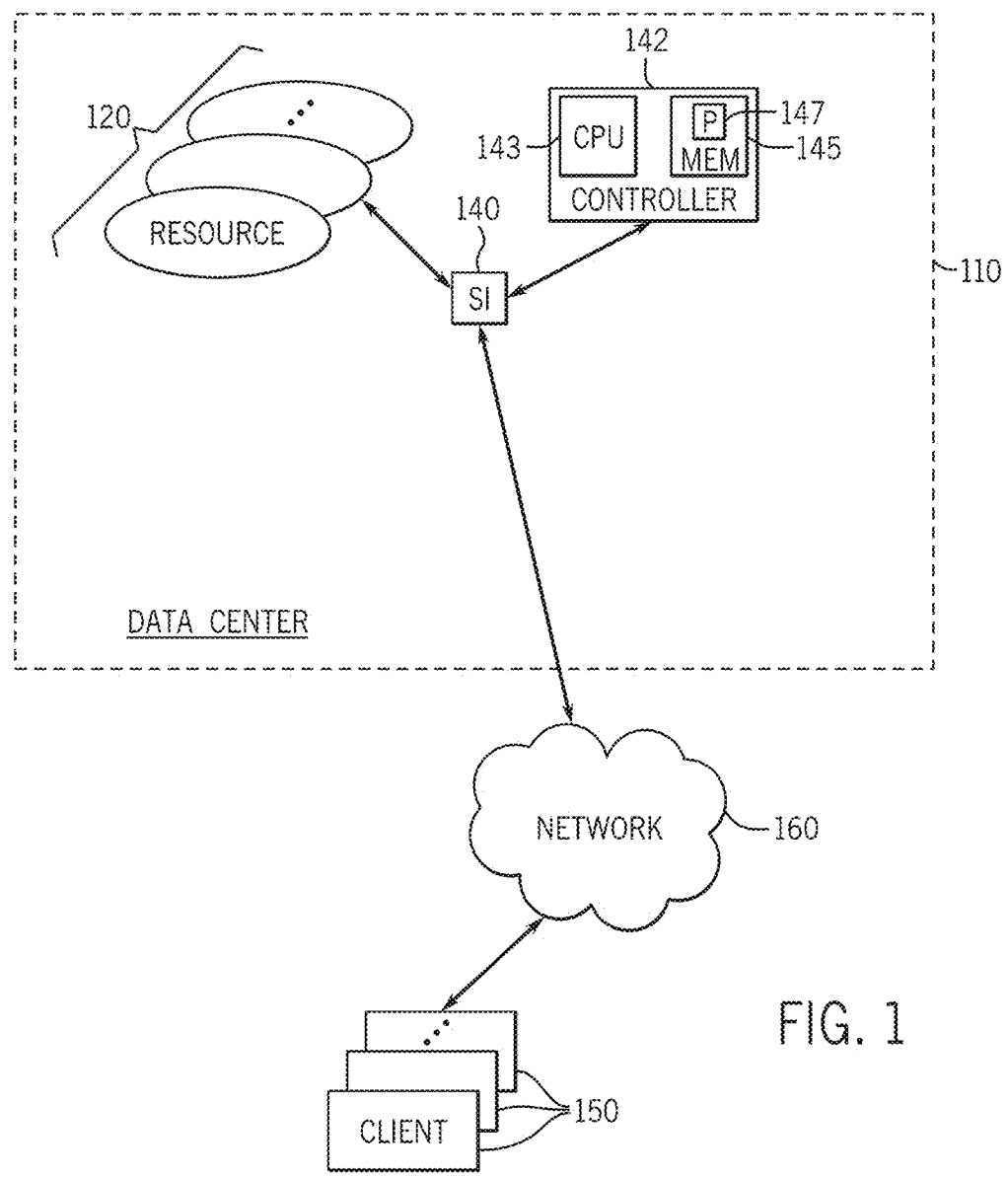
FIG. 1 is a schematic diagram of a computer system according to an example implementation.

Referring to FIG. 1, in accordance with systems and techniques that are disclosed herein, a datacenter 110 includes resources 120 (cool processors, fast processors, wide area network (WAN) connection interfaces, local area network (LAN) connection interfaces, storage area network (SAN) connections, hosts, and so forth) and a switch interconnect 140 for purposes of providing one or multiple configurations for tenants of the datacenter 110. As further described herein, a programmable controller 142 of the datacenter 110 selectively configures the circuit switches of the switch interconnect 140 for purposes of configuring ports providing the appropriate uplink ports, downlink ports, resources 120, bandwidth allocations and failover capabilities for each of the tenant configurations. The downlink ports, in general, are packet switch ports that are selectively coupled to the resources 120 by the circuit switches, and the uplink ports are formed from packet switch ports that are coupled together by circuit switches to provide relatively high bandwidth network, or spine, connections.

In general, a packet switch is a device (an Ethernet card, for example) that is configured to switch data packets based on data headers indicating destinations of the packets. A circuit switch (an electrical, transistor-based switch or an optical switch, as examples) forms "wired" connections between different circuit nodes.

For the example implementation depicted in FIG. 1, the datacenter 110 may be accessed by one or multiple clients 150 (clients of various tenants, for example) via network 160 that is external to the data center 110 and is coupled to network fabric of the switch interconnect 140 The network 160 generally represents LAN fabric, WAN fabric, Internet-based fabric, and so forth.

The datacenter 110, in accordance with example implementations that are disclosed herein, includes at least one physical machine that is made up of actual software and hardware. As examples, a physical machine in this context may be an Ethernet packet switch containing a controller, memory and so forth; and a given physical machine may also refer to a controller card; a given tenant configuration of resources 120 and packet switches; processor blades; a desktop computer; a notebook computers; and the like. In this manner, the datacenter 110 includes one or multiple physical machines, where each physical machine includes one or multiple CPU(s), a memory, network interfaces, I/O devices, and so forth.

The controller 142 of the datacenter 110, in general, includes one or multiple CPUs 143 (one CPU 143 being depicted in FIG. 1) and a memory 145 that stores machine executable instructions 147, or software, which are executed by the controller 142 to program the switch interconnect 140, as further disclosed herein. The memory 145, in general, is a non-transitory storage medium that may be formed from semiconductor storage devices, magnetic storage devices, optical storage devices, a combination of different storage technologies, and so forth, depending on the particular implementation.

Moreover, depending on the particular implementation, the controller 142 may or may not be part of the switch interconnect 140. In this manner, depending on the particular implementation, the controller 142 of FIG. 1 may be single controller that is programmable to control the switch interconnect 140 or may be formed from a collection of controllers that control the switch interconnect 140.

Figure 2:
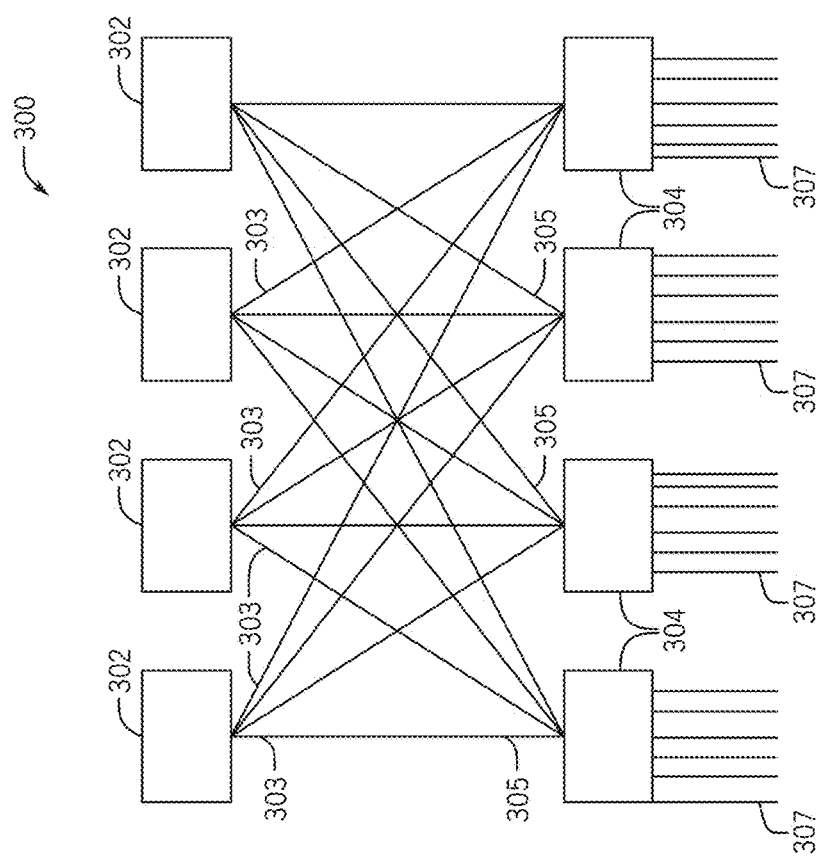
FIG. 2 is a schematic diagram illustrating a folded Clos network according to an example implementation.

In accordance with example implementations, the switch interconnect 140 may be programmed by the controller 142 to form a wide variety of networks. Referring to FIG. 2, in accordance with an example implementation, the switch interconnect 140 may be used to form a folded Clos network 300 for a given tenant. In general, the folded Clos network 300 includes packet switches 302 having uplink ports 303 that are coupled to uplink ports 305 of other packet switches 304. The packet switches 304 also include downlink ports 307 that may be coupled to hardware resources (not shown), such as network interfaces, processors, storage area network interfaces, hosts, and the like. In general, the switch interconnect 140 may be used for a number of other network topologies (a direct connect network, as another example).

Figure 3A:
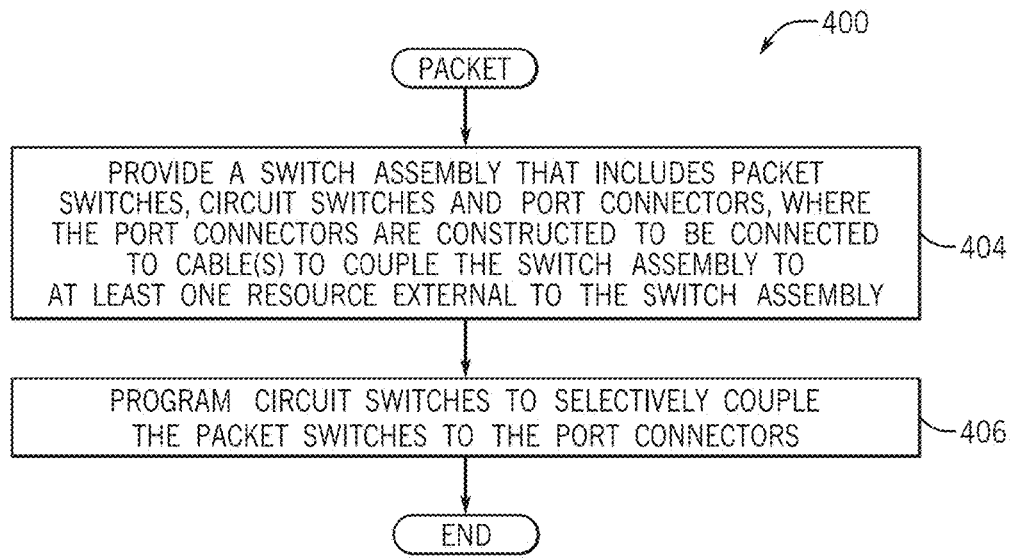
FIGS. 3A and 3B are flow diagrams of techniques to use switch assemblies according to example implementations.

Referring to FIG. 3A, in accordance with example implementations, a technique 400 includes providing (block 404) a switch assembly that includes packet switches, circuit switches and port connectors. The port connectors are constructed to be connected to one or multiple cables to couple the switch assembly to at least one resource that is external to the switch assembly. The technique 400 further includes using (block 406) the circuit switches to selectively couple the packet switches to the port connectors of the switch assembly.

Figure 3B:
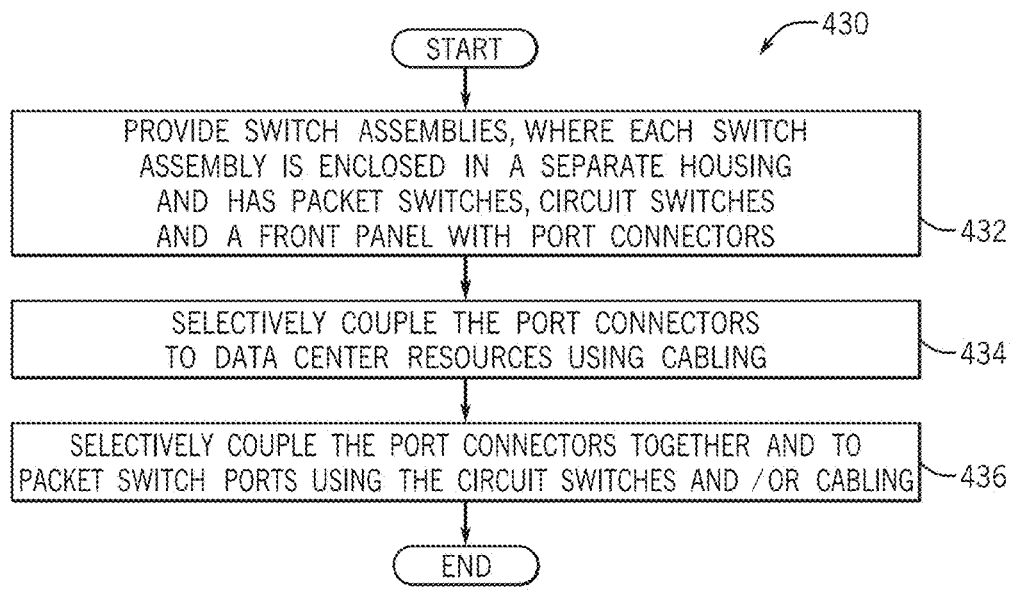

More specifically, referring to FIG. 3B, in accordance with example implementations, a technique 430 includes providing (block 432) switch assemblies, where each switch assembly is enclosed in a separate housing and has packet switches, circuit switches and a front panel with port connectors. According to the technique 430, the port connectors may be selectively coupled to datacenter resources using cabling, pursuant to block 434. Also, according to the technique 430, the port connectors may be selectively coupled together and to packet switch ports using the circuit switches and/or cabling, pursuant to block 436.

Figure 4:
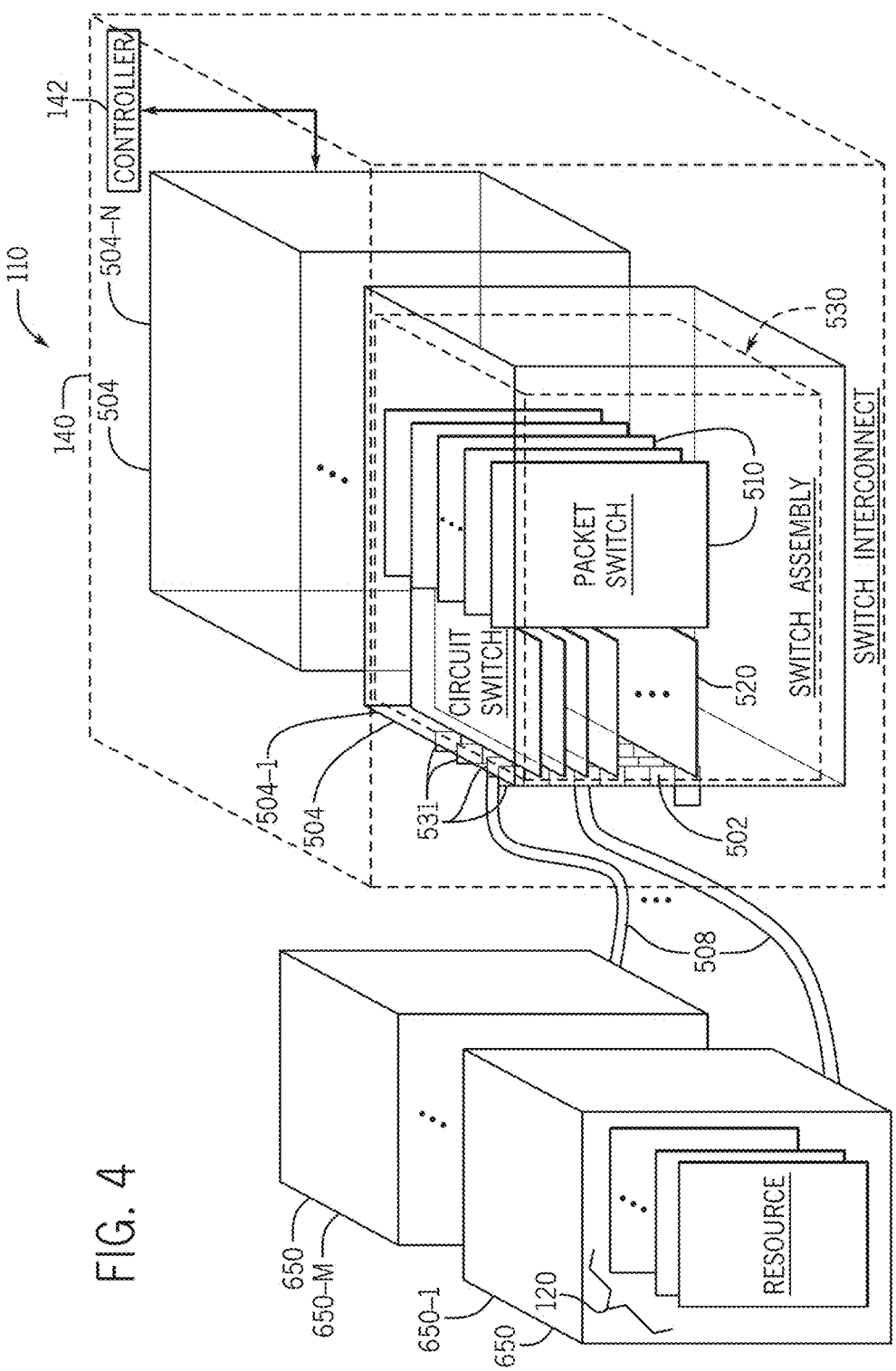
FIG. 4 is a perspective view of a datacenter according to an example implementation.

FIG. 4 depicts the switch interconnect 140 and resources 120 of the datacenter 110 in accordance with a more specific example implementation. In general, for this example implementation, the switch interconnect 140 includes one or multiple switch assemblies 530; and in accordance with example implementations, the switch assembly 530 may be contained in an associated cabinet 504 (cabinets 504-1 and 504-N of N cabinets, being depicted as an example in FIG. 4).

As also depicted in FIG. 4, the switch assembly 530 has packet switches 510 (Ethernet switches, for example) and circuit switches 520 (optical or electrical switches, as examples) that selectively couple ports of the packet switches 510 to multilink port connectors 531 of a front panel 502 of the switch assembly 530. In general, the circuit switches 520 are controlled by the controller 140 to configure the switch assembly 530 in one of many potential arrangements, as further described herein.

As depicted in FIG. 4, cables 508 (optical fiber cables, for example) may be used to couple the port connectors 531 to hardware cabinets 650 (cabinets 650-1 and 650-M of M cabinets being depicted as an example in FIG. 4) in which the resources 120 (see FIG. 1) are disposed. Cables may also be used to couple port connectors 531 of switch assemblies 530 together, which are used as spine switches, as further described herein.

Figure 5A:
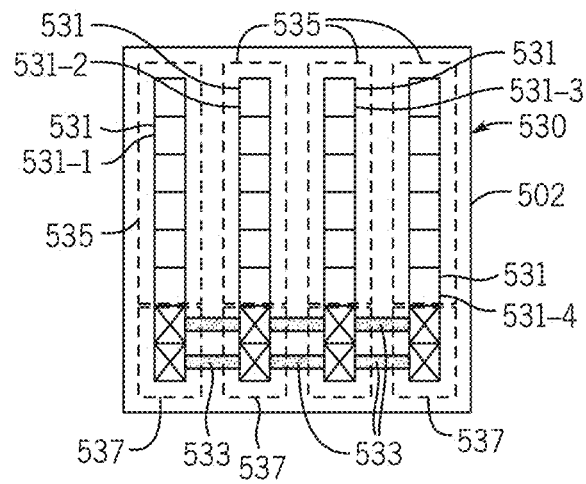
FIGS. 5A, 5B and 5C are schematic diagrams illustrating different networks achieved through the use of at least one switch assembly according to example implementations.

Referring to FIG. 5A in conjunction with FIG. 4, in accordance with an example implementation, the front panel 502 has four port connectors 531 (port connectors 531-1, 531-2, 531-3 and 531-4, being depicted in FIG. 5A). In a conventional notation, each port is associated with a particular Ethernet switch. The circuit switches 520 of the switch assembly 530, however, allow the selective connection of the ports of a given port connector 531 to the ports of any of the packet switches 510 of the switch assembly 530, thereby allowing a wide variety of configurations, as set forth in the examples below.

In accordance with an example implementation, each port connector 531 may contain eight multilink ports, where each multilink port may contain 16 Ethernet ports. Of the eight multilink ports, six multilink ports 535 are downlink ports that are coupled to corresponding packet switch ports and support host attachment; and two multilink ports 537 that are each configured as an uplink port. Thus, the multilink ports 537 for this example are not used as downlinks, and the circuit switches 520 of the switch assembly 520 couple ports of the packet switches 510 together to provide crosslink connections between the packet switches 510.

Due to the programmability of both the circuit 520 and packet 510 switches of the switch assembly 530, four actual packet switches 510 (four Ethernet switch cards, for example) may serve as one combined large Ethernet switch. For the example of FIG. 5A, the interconnect programming via the circuit switches 510 configure crosslinks 533 as a fully-connected clique with four Ethernet switch cards each providing ten lanes between each switch pair. Therefore, thirty of the thirty two lanes provided by the multilink ports 537 may be used to build a symmetric four-way clique. The remaining leftover lanes of the ports 537 may be wired opportunistically for additional performance. Thus, with this configuration, the switch assembly 530 of FIG. 5A may serve as a single Ethernet switch having 384 downlinks. Configurations with fewer hosts may be supported by removing Ethernet switches. The cross-sectional bandwidth may be varied by removing or adding crosslinks 533 between switches. Depending on the particular implementations, a given crosslink 533 may be created by a jumper cable or by circuit switch connection. Fault tolerance may be provided using a spare packet switch 510 of the switch assembly 530, which may be quickly brought online, as further disclosed herein.

Figure 5B:
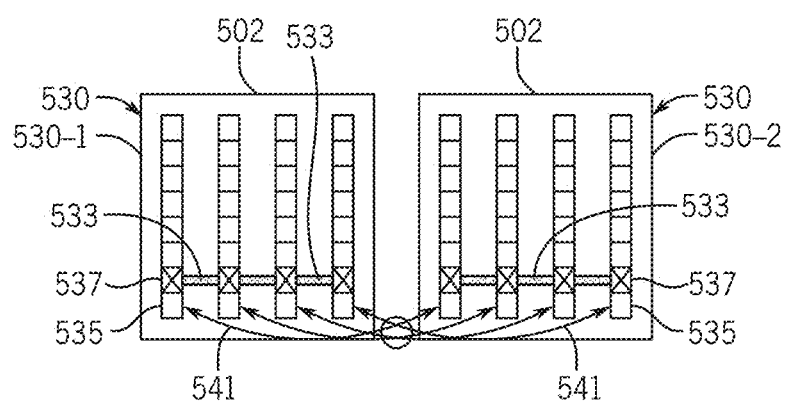

The relatively small network of FIG. 5A may be contrasted to the relatively medium size network of FIG. 5B which is formed from two switch assemblies 530 (i.e., switch assemblies 530-1 and 530-2). Referring to FIG. 5B, the circuit switches 520 of each switch assembly 530 provide connections between the ports 537 of the assembly 530; and cables 541 may be used to connect the ports 537 of the two switch assemblies 530. In general, the arrangement shown in FIG. 5B may be used form a 768 port eight switch clique.

Figure 5C:
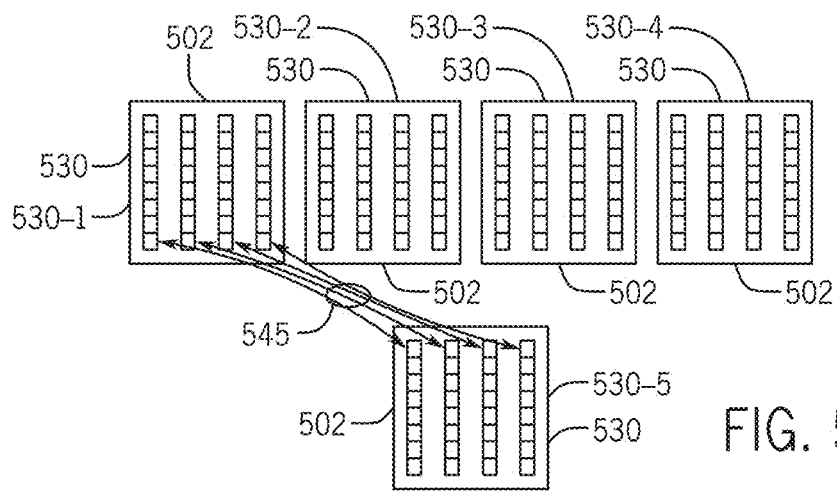

As a further example, FIG. 5C depicts a relatively medium to large size network, which is formed from five switch assemblies 530 (i.e., switch assemblies 530-1, 530-2, 530-3, 530-4 and 530-5). In this regard, the five switch assemblies 530 may be connected as shown in FIG. 5C to form a Clos network with 1536 host links. The Clos network retains fault tolerance and always on maintenance properties regardless of whether the given switch assembly 530 is used as a leaf or as a spine. For the example of FIG. 5C, the switch assemblies 530-1, 530-2, 530-3 and 530-4 are leaf switch assemblies, and the switch 530-5 is a spine switch assembly. For this implementation, two multilink ports of each port connector of each leaf switch assembly 530 serve as spine uplink ports, and the remaining six multilink ports are downlink ports used for edge device connectivity. Sixty-four lane super cables 545 may be constructed by aggregating four multilinks. One of the eight super cables 545 that is used to wire the full Clos network is depicted in FIG. 5C. Full by section bandwidth for 1024 host links may be supported by cable connecting a second switch assembly 530 as a spine (not shown in FIG. 5C).

The switch assembly 530 may be connected/configured to implement numerous other network topologies. For example, a network may be scaled to twice as many host ports (3072 using eight switch assemblies 540 that serve as leaf switches and two switch assemblies 530 that server as spine switches). For this larger network, one super cable may connect each leaf to each spine. Any subset of these Clos configurations may contain fewer leaf or spine switches 530 or fewer cards in any particular switch assembly 530. The interconnect is optimized for each configuration's available hardware, and the network is expanded as needed.

Figure 6:
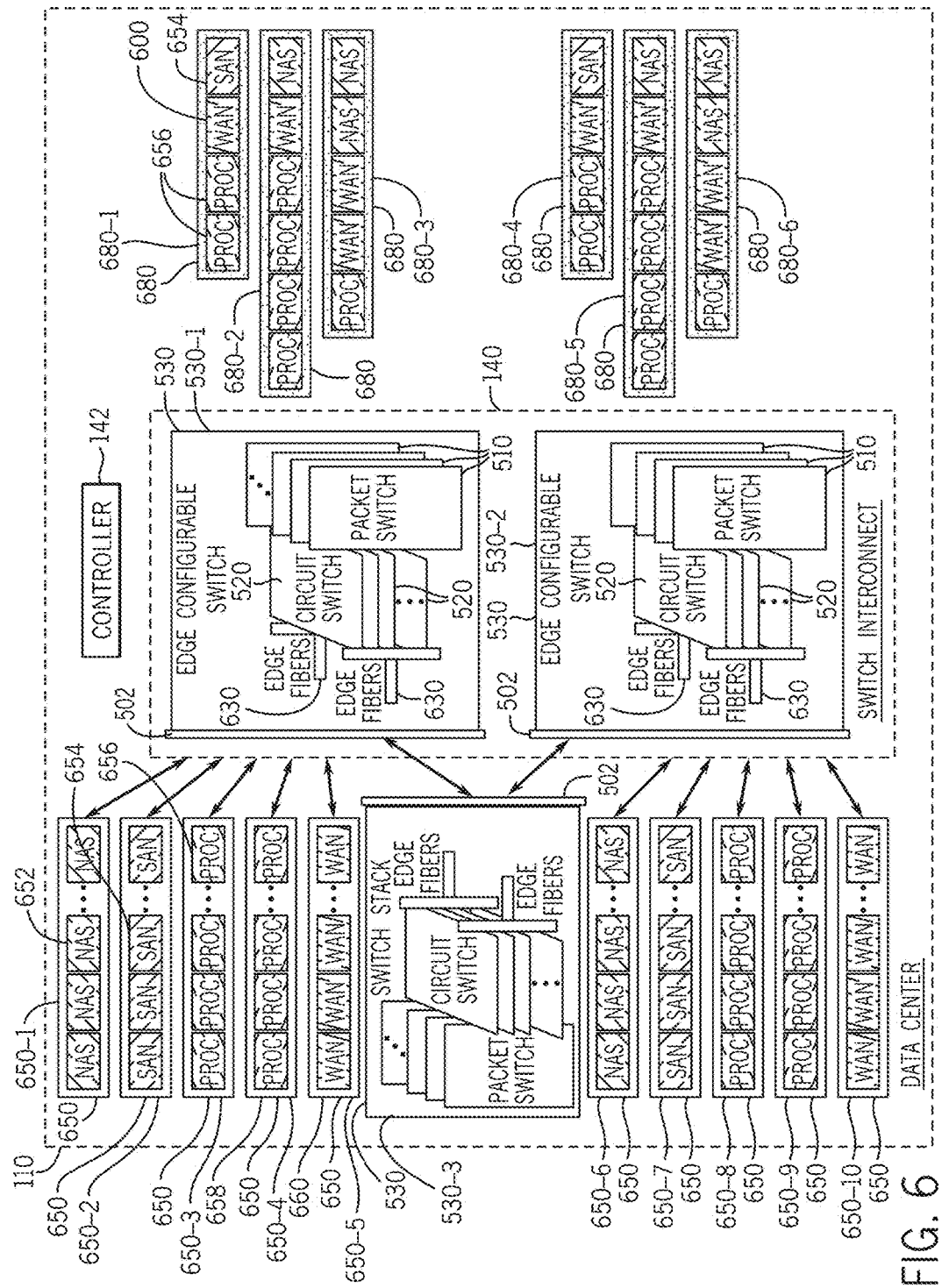
FIG. 6 is a schematic diagram of the datacenter according to an example implementation.

Referring to FIG. 6 in conjunction with FIG. 1, in accordance with an example implementation, the switch interconnect 140 include multiple switch assemblies 530 (three example switches 530-1, 530-2 and 530-3, being depicted in FIG. 6), which are programmed by the controller 142. The switch assembly 530 contains packet switches 510, such as Ethernet switches (as an example), and circuit switches 520.

Regardless of the implementation, in accordance with some implementations, each circuit switch 520 is connected to a port of each of the packet switches 510. In general, the circuit switches 520 are programmable by the controller 142 for purposes of configuring the specific host and network architectures for the tenants 150 (see FIG. 1). The external connections to the circuit switches 520 and are formed via connectors of the front panel 502 of the switch 530. In this manner, FIG. 6 schematically depicts edge optical fibers 630 that are coupled to the circuit switches 520. In general, in accordance with some implementations, each circuit switch 520 of the switch assembly 530 may have one terminal connected to the same port number in all of the packet switches 520 via connections from between the front panel 502 and the hardware cabinets 640.

Depending on how the given switch assembly 530 is used, the front panel 502 may be used to attach compute, storage, and wide area networking equipment resources as well as spine switching equipment (providing core bandwidth) to the circuit switches 520 of the switch assembly 530. For example, to use the switch assembly to form leaf edge connection (such as the switch assemblies 530-1 and 530-2 of FIG. 6), each circuit switch 520 may have a terminal coupled to the same port in all of the hardware cabinets 650.

As another example, for a spine connection (such as for switch assembly 530-3), the front panel 502 may be used to connect the circuit switches 520 of one switch assembly 530 to the circuit switches 520 of another switch assembly 530 so that the packet switches 510 of the switches 530 may be coupled together.

In general, in accordance with example implementations, each individual optical fiber 630 couples an endpoint to any packet switch 510 in the switch 530 via programming of the circuit switch 520 to which the fiber 630 is physically connected.

For the example implementation that is depicted in FIG. 6, the cabinet 650-1 contains network attached storage (NAS) blades 652; the cabinet 650-2 contains storage attached network (SAN) blades 654; the cabinet 650-3 contains fast processor (FP) blades 658; the cabinet 650-4 contains cool processor (CP) blades 658; and the cabinet 650-5 contains wide area network (WAN) blades; although other blade resources may be used, in accordance with further implementations.

The switch interconnect 140 addresses several challenges that may be present when configuring a datacenter for many optimized hosts and network architectures. First, network performance may be relatively more efficient if locality is maintained for all of the computing entities of a particular tenant, i.e., a locality due to the computing entities for the same tenant being coupled to the same packet switch 510. In general, the circuit switches 520 may be programmed by the controller 142 to match the network topology to the traffic pattern. For example, network communication may be relatively high, or consume a relatively large bandwidth, between endpoints belonging to the same tenant or endpoints that are part of the same application. When relatively small applications or relatively small tenants use a mix of heterogeneous resources, locality may be enhanced.

In this manner, when a new tenant uses two relatively fast CPUs as well access to the WAN and SAN, the locality may be enhanced. The resources may be dynamically mapped, for example, by the switch assembly 530 to a single packet switch 510 to build a mini-cluster that is customized for the tenant. This provides relatively high bandwidth and low latency without the need spine switch bandwidth.

The circuit switches 520 provide a relatively simple means to scale spine bandwidth without wasting spine or leaf ports. In accordance with example implementations, the ports of the packet switch 510 are identical and may be used as either a spine port (such as for the switch assembly 530-3, for example) or as a blade port (such as for the switch assemblies 530-1 and 530-2, for example).

The circuit switching allows partitioning of hardware to implement separate networks for fault tolerance and/or for heterogeneous traffic segregation. The fault tolerance uses a topology design to assign ports to network fault zones as the number of cabinets 650 and spines are varied. Independent networks may be used to segregate tenants or applications; high and low priority traffic; lossless SAN-less traffic and lossy LAN traffic; separate Ethernet and InfiniBand transport traffic for networks having both Ethernet and InfiniBand hardware; and so forth.

In general, the switch interconnect 140 enhances fault tolerance as each resource 120 is connected, through the circuit switch 520 to multiple packet switches 510. If the packet switch 510 to which a given resource 120 is attached fails, the resource 120 may be connected to another packet switch 510 and continue operation. Thus, should a packet switch 510 fail, the resources 120 that are connected to the packet switch 510 may still be used, by reconfiguring the switches 520.

Thus, in accordance with example implementations, at least one of the packet switches 510 serves as a spare. In addition to being used as a failover device, the spare may also be used to perform network upgrades with taking the switch assembly 530 offline. For example, in accordance with an example implementation, the firmware of the packet switches 510 may be upgraded as follows. First, the controller 142 programs the spare packet switch 510 with a new version of firmware. Next, the controller 142 reprograms the circuit switches 520 to "hot swap" the spare, upgraded packet switch 510 with one of the packet switches 510 that was currently being used. The controller 142 may then update the firmware on the newly designated spare and repeat the above-described process until the firmware upgrade for all of the packet switches 510 is complete.

FIG. 6 further depicts task clusters 680 (task cluster 680-1, 680-2 . . . 680-6, being depicted in FIG. 2 as examples) that may be created for one or multiple tenants of the datacenter 110. Each task cluster 680, in turn, may contain a specific configuration of resources for an associated tenant. For example, the task cluster 680-1 has two processor blades 656, a WAN blade 660, and a SAN blade 654. As an example the task clusters 680-1 and 680-4 may represent the allocation of resources for the two switch assemblies 530-1 and 530-2 for a given tenant 150.

The switch interconnect 140 is programmed to customize the mapping of both the uplink and downlink ports onto the packet switches 510. As an example, the circuit switches 520 may be programmed to provide an even distribution of the uplink ports across the packet switches 510. Such a configuration may be used to implement a Clos network with an uplink bandwidth that increases as the number of connected uplink ports increase. A round robin assignment of uplink ports onto the packet switches 510 may be sufficient to approximately balance the bandwidth between the leaf and spine switches, in accordance with example implementations. As spines are added, the switch interconnect 140 may be reprogrammed to accommodate additional spines.

The switch interconnect 140 may be programmed to customize the mapping from the resources 120 to the packet switches 510. This provides fault tolerance and enhances communication locality. In particular, the programming of the switch interconnect 140 allows the customization of a set of heterogeneous resources that are directly attached to the same packet switch 510 on a per-tenant basis.

Figure 7:
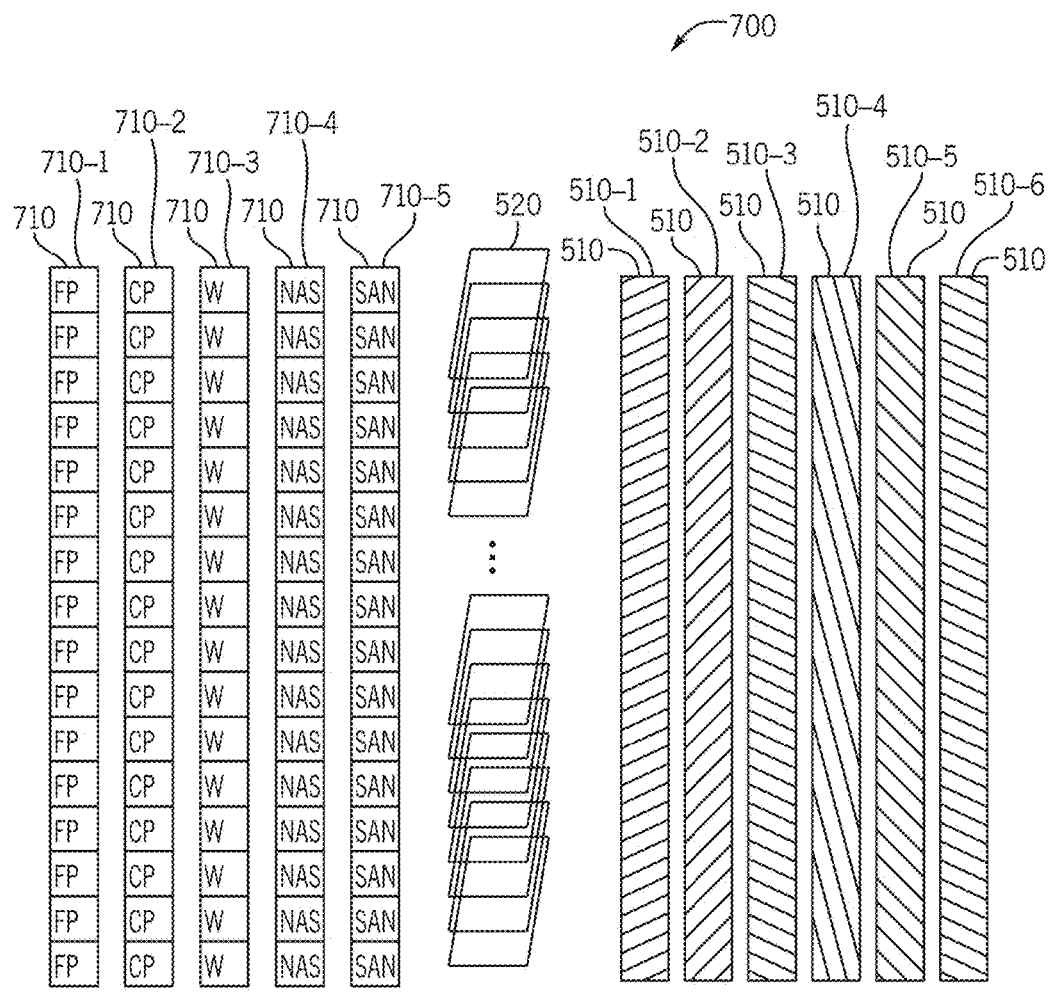
FIG. 7 is an illustration of a collection of resources, packet switches and circuit switches that may be used to provide a set of tenant configurations according to an example implementation.

Referring to FIG. 7, as more specific example, a collection 700 of resources may be available in an example datacenter that employs the switch assemblies 530. For this example, the datacenter includes four hardware cabinets 710 (cabinets 710-1, 710-2, 710-3, and 710-4), where for this example, each cabinet 710 has sixteen resources. More specifically, accordance with an example implementation, the cabinet 710-1 has sixteen fast processor (FP) blades; the cabinet 710-2 has sixteen low power or "cool" processor (CP) blades; the cabinet 710-3 has sixteen WAN blades (designated by "W" in FIG. 4); the cabinet 710-4 has sixteen NAS blades; and the cabinet 710-5 has sixteen SAN blades. Moreover, the example resource collection 700, six packet switches 510 and the associated circuit switches 520 are available from an associated switch assembly 530. As an example, five of the packet switches 510 may be active, with the sixth packet witch 510 being an untowered spare that serves as a redundant packet switch to be brought up as a replacement when one of the other five packet switches 510 fails.

If the switch interconnect 140 is configured to connect multiple resources to a common packet switch 510, then the resources are considered to be locally connected. Thus, for such a configuration, each packet switch 510 has local resources. These resources are local to the packet switch 510 and are connected with low latency through a single Ethernet hop, for example.

As an example, in accordance with some implementations, each packet switch 510 may provide a number (N) of ports greater than sixteen. In accordance with example implementations, all N ports of the packet switches 510 may be identical. However, some ports may be deployed as downlink ports to resources 120, whereas other ports may be deployed as uplink ports to spines. In accordance with some implementations, sixteen downlink ports are coupled to the blade cabinets 710, with the remaining ports being used as uplink ports that are connected to the spines. A vertical stack on N 5×6 bidirectional circuit switches provide the configurability.

For each of the sixteen index blade positions (i.e., indices of 0, 1, 2, and so forth), an associated circuit switch has an attachment to each of the five cabinets 710. Similarly, in accordance with example implementations, for each of the N leaf switch port positions (i.e., ports having indices of 0, 1, 2, and so forth), an associated circuit switch has an attachment to each of the packet switches 510. Additional circuit switch elements attach leaf ports to spine switch ports that interconnect packet switches in a Clos network.

Figure 8:
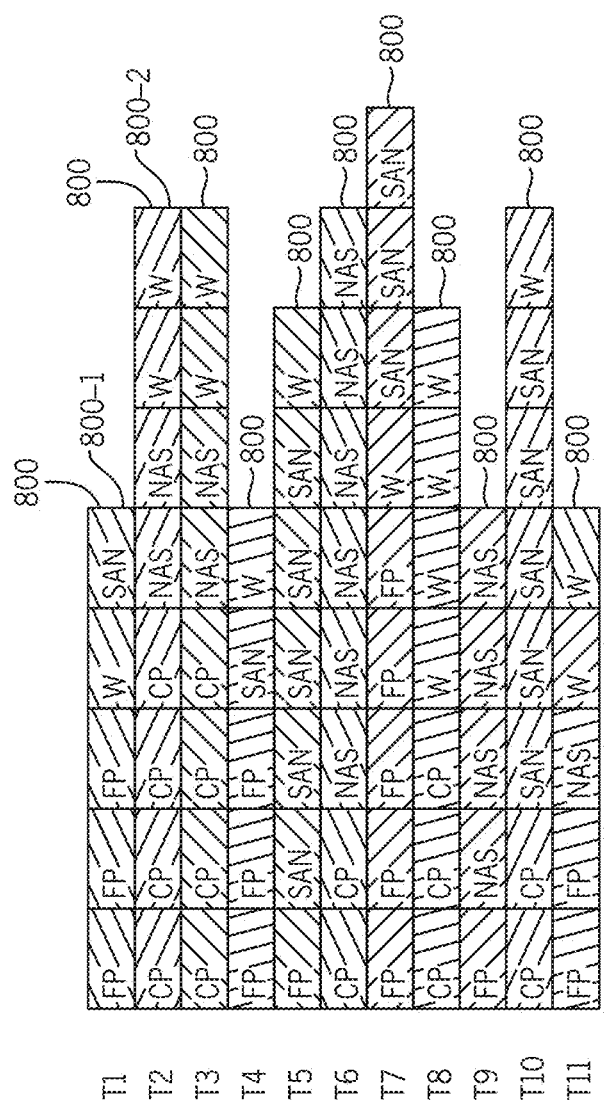
FIG. 8 illustrates resource assignments among different tenants according to an example implementation.

Using the resource collection 700 of FIG. 7 as an example, accordance with some implementations, the circuit switches 520 may be programmed to assign resources to eleven tenants, T1-T11, as depicted in FIG. 8. Each row of FIG. 8 is associated with a group 800 of blade resources assigned to a particular tenant. For example, the first row depicts a group 800-1 of resources assigned to the tenant T1. In this manner, the group 800-1 includes three fast processors, a WAN resource, and a SAN resource. As shown in FIG. 8, the different tenants T1-T11 have different resources.

Figure 9:
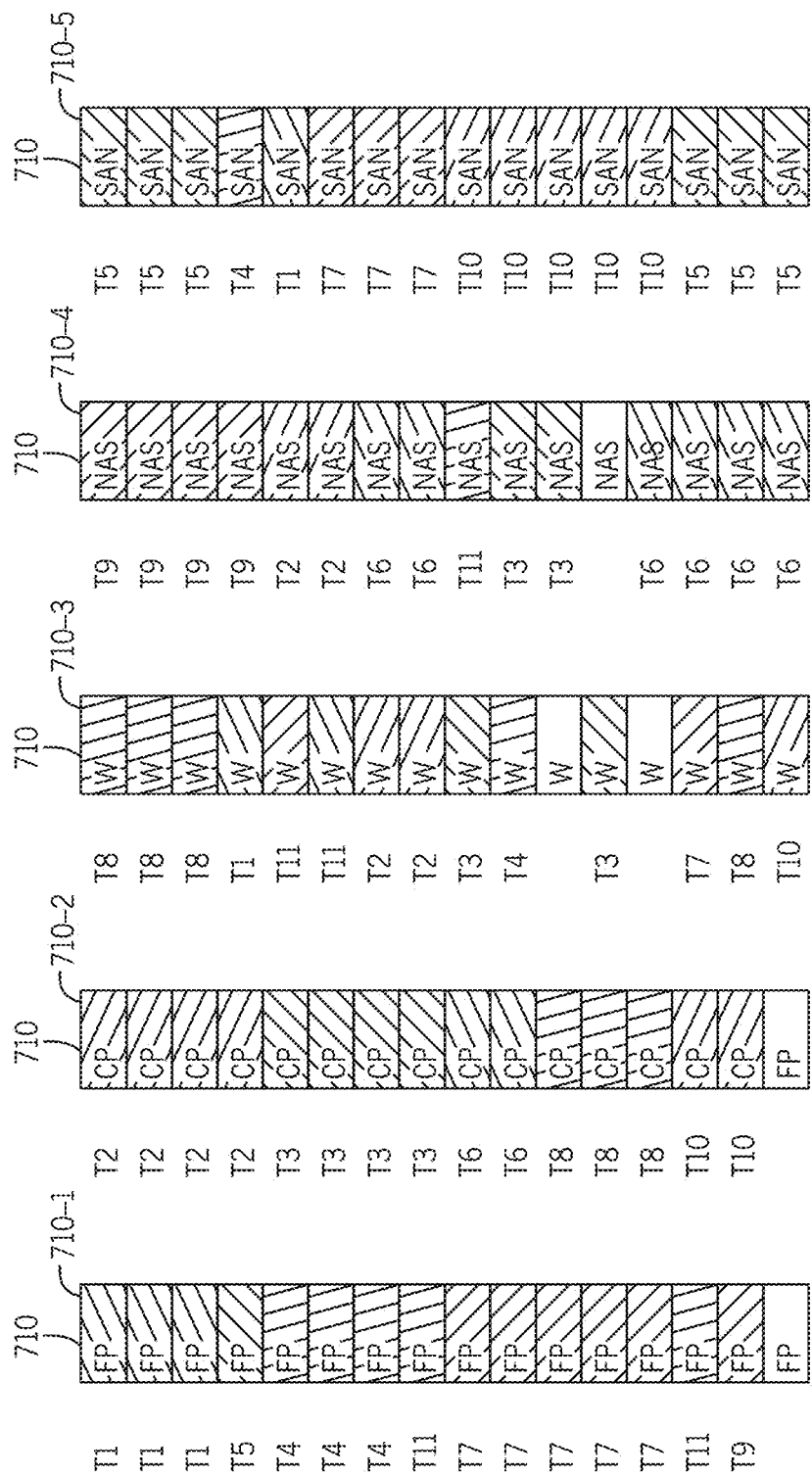
FIG. 9 is an illustration of a distribution of resources according to an example implementation.

An example network configuration, which results in a reduced spine traffic by localizing tenant processing, is illustrated in FIG. 9. More specifically, in FIG. 9, each vertical column represents a cabinet 710 with sixteen blades. Each in-use blade is labeled in FIG. 9 with the name of the tenant that is using the blade. In addition, the crosshatching indicates the selected packet switch 510 that is used, comparing FIG. 9 with FIG. 7. This choice is determined by the programming of the circuit switch 520 within the packet switch 510, which corresponds to the blade's position.

Referring also to FIG. 8, the assigned crosshatching for each tenant resource are also shown as being annotated into each tenant row. All five tenant T1 resources are connected through the circuit switch to the leaf switch 510-1 of FIG. 7. These resources have been configured as a mini-cluster, which is customized for the T1 tenant. In this manner, all of the T1 tenants' resources may be connected through a single Ethernet hop. Additional tenants are allocated in a similar manner, and each of the tenants T1-T10 have all resources assigned to a single packet switch 510, for this example implementation.

As more tenants are allocated and fewer blade positions remain, it may be more challenging to map all of the resources to a single Ethernet switch. In this manner, tenant T11 has five resources that have been mapped onto three Ethernet switches. Traffic between the three packet switches 510 is connected through spine switches in the core, and thus, tenant T11 continues to function correctly but uses core bandwidth to maintain connectivity between its resources.

For the specific example of FIGS. 7-9, the packet switch 510-6 (see FIG. 7) has not yet been used. If any of the other packet switches 510-1 to 510-5 should fail, the packet switch 510-6 may be brought online to replace the failed packet switch 510-6 by reprogramming the circuit switches 520. It is noted that a packet switch 510, such as packet switch 510-6, may be used either for fault tolerance or for purposes of enhancing tenant traffic locality. The addition of a spare packet switch 510 provides additional programming flexibility, which enhances locality. When the extra packet switch 510-6 is used, all resources for the tenant T11 may be mapped to the switch 510-6 and connected in a mini-cluster by the switch 510-6. Thus, many implementations are contemplated, which are within the scope of the intended claims.

In accordance with some implementations, the controller 142 may program the circuit switches 520 to selectively couple the port connectors to the packet switches 510 in a manner that enhances the locality based on a description of how the resources are allocated among the tenants. In further implementations, the controller 142 may program the circuit switches 520 to enhance the locality based on network measurements.

More specifically, in accordance with example implementations, the packet switch 510 is constructed to sample packets and send the packet samples to the controller 142. The "sFlow" packet sampling standard provides one existing method for sampling packets and measuring network traffic. The controller 142 uses the samples to calculate a traffic matrix that estimates traffic from each input port to each output port, and this traffic matrix can be used to identify network ports that commonly communicate and can be used to program circuit switches to enhance traffic locality. Traffic estimation can be used to identify traffic patterns that occur from communications within tenants, from communications within applications, or from any other cause for a non-random communications structure that provides communications locality. A traffic matrix can be used to identify clusters of ports that frequently communicate. Based on the identified clusters, the controller 142 may program the circuit switches 520 so that clusters of ports are connected to a single leaf switch to enhance communication locality.

It is noted that the switch assemblies 530 may offer significant advantages for modular expansion. In this manner, a given port of the switch assembly 530 may be used as either a downlink or as an uplink port. The downlink ports allow attachment to additional compute or storage blades. Uplink ports provide additional bisection bandwidth. With the edge-configurable switch 530, a single circuit switch 520 may be used, in accordance with some configurations, to control the distributions of downlinks across packet switches 510 (as described above) or, in other configurations, to control the distribution of leaf switch uplinks across spine switches.

The circuit switch optimization may evenly distribute cabinets across spine modules. Alternatively, circuit switch optimization may implement multiple independent networks using distinct spine switches for each network.

As also described herein, the switch assembly 530 may be also used as a core module, in accordance with example implementations. This permits a single module to be used for the datacenter edge and for the datacenter core. This allows the programmable distribution of spine hardware ports across leaf cable bundles and leaf stacks.

While a limited number of examples have been disclosed herein, those skilled in the art, having the benefit of this disclosure, will appreciate numerous modifications and variations therefrom. It is intended that the appended claims cover all such modifications and variations.

What is claimed is:

1. An apparatus comprising:
   a switch assembly comprising packet switches, circuit switches and port connectors, each of the port connectors being adapted to attach to a cable to couple the port connectors to a hardware resource; and
   a controller to program the circuit switches of the switch assembly to selectively couple the packet switches to the port connectors.

2. The apparatus of claim 1, wherein the circuit switches comprise optical switches or electrical switches.

3. The apparatus of claim 1, wherein the packet switches comprise a first set of packet switches coupled to the port connectors and at least one reserve packet switch to be used as a spare.

4. An article comprising a non-transitory computer readable storage medium to store instructions that when executed by a computer cause the computer to:
   program circuit switches of a switch assembly to selectively couple a plurality of packet switches of the switch assembly to port connectors of the assembly, the port connectors being adapted to mate with cables to connect the switch assembly to hardware resources.

5. The article of claim 4, the storage medium storing instructions that when executed by the computer cause the computer to program the circuit switches to regulate based on a traffic locality based on network measurements.

6. The article of claim 4, the storage medium storing instructions that when executed by the computer cause the computer to program the circuit switches to regulate a traffic locality based on a description of an allocation of the resources among tenants.

7. A method comprising:
   providing a switch assembly comprising packet switches, circuit switches and ports;
   using at least one cable to connect at least one of the ports to at least one resource; and
   using the circuit switches to selectively couple the packet switches to the ports.

8. The method of claim 7, wherein at least one of the circuit switches is connected to each of the packet switches.

9. The method of claim 7, further comprising:
   using a packet switch of the plurality of packet switches as a spare.

10. The method of claim 9, further comprising:
    programming the spare packet switch to update the spare packet switch with a more recent version of machine executable instructions than a version of machine executable instructions stored on another packet switch of the plurality of packet switches which is not being used as a spare; and
    swapping the spare packet switch with the another packet switch after the programming.

11. The method of claim 7, wherein using the circuit switches comprises programming the circuit switches, the method further comprising:
    adding at least one additional packet switch to the plurality of packet switches; and
    reprogramming the circuit switches after the addition to provide additional network performance using the at least one additional packet switch.

12. The method of claim 7, wherein using the circuit switches comprises programming the circuit switches, the method further comprising:
    adding at least one spare packet switch to the plurality of packet switches and, programming the controller to failover to the spare in response to one of the plurality of packet switches failing.

13. The method of claim 7, wherein using the circuit switches comprises programming the circuit switches, the method further comprising:
    coupling at least one additional resource to at least one port of the plurality of ports; and
    reprogramming the circuit switches after the addition to accommodate the at least one additional resource.

14. The method of claim 7, wherein using the circuit switches comprises programming the circuit switches, the method further comprising:
    acquiring network traffic measurements; and
    reprogramming the circuit switches to increase a traffic locality based on the measurements.

15. The method of claim 7, wherein using the circuit switches comprises:
    programming the circuit switches to increase a traffic locality based at least in part on a description of how the resources are allocated among tenants.

* * * * *